(12) United States Patent
Cheng et al.

(10) Patent No.: US 8,743,217 B2
(45) Date of Patent: Jun. 3, 2014

(54) WIRELESS IMAGE TRANSMISSION DEVICE

(75) Inventors: Jason Cheng, Taipei (TW); Chen-Ping Yang, Taipei (TW)

(73) Assignee: Digilife Technologies Co., Ltd., Taipei (TW)

( * ) Notice: Subject to any disclaimer, the term of this patent is extended or adjusted under 35 U.S.C. 154(b) by 18 days.

(21) Appl. No.: 13/548,441

(22) Filed: Jul. 13, 2012

(65) Prior Publication Data

US 2014/0015986 A1    Jan. 16, 2014

(51) Int. Cl.
*H04N 5/225*    (2006.01)
(52) U.S. Cl.
USPC .................................. 348/207.1; 348/207.99
(58) Field of Classification Search
None
See application file for complete search history.

(56) References Cited

U.S. PATENT DOCUMENTS

2006/0023069 A1*    2/2006   Saito ......................... 348/207.99

* cited by examiner

*Primary Examiner* — Twyler Haskins
*Assistant Examiner* — Angel L Garces-Rivera
(74) *Attorney, Agent, or Firm* — WPAT, P.C.; Anthony King

(57) ABSTRACT

A wireless image transmission device includes an image processing main body; an image display unit electrically connected to the image processing main body; a first switching unit electrically connected to between the image processing main body and the image display unit; an image shooting control unit electrically connected to the first switching unit; and a wireless transmission unit electrically connected to the image shooting control unit. With these arrangements, images to be wirelessly transmitted from the wireless image device need not be converted in file type, so that the wireless image transmission device can have high transmission efficiency and simplified overall configuration to overcome the drawback of complicated configuration in the prior art wireless image transmission device.

4 Claims, 2 Drawing Sheets

WIRELESS IMAGE TRANSMISSION DEVICE

FIELD OF THE INVENTION

The present invention relates to a wireless image transmission device, and more particularly to a wireless image transmission device that allows images to be wirelessly transmitted therefrom without the need of first being converted in file type.

BACKGROUND OF THE INVENTION

Currently, camera devices have become very popular among consumers and wireless transmission technology has already been highly developed. However, according to the currently available wireless image transmission technique for various kinds of digital cameras, a Secure Digital Input Output (SDIO) interface is usually required for wirelessly transmitting captured images from the digital camera to a remote electronic device. With the SDIO interface, images must first be converted in file type and then compressed before they can be wirelessly transmitted to a remote electronic device using for example Wireless Fidelity (Wi-Fi). On the other hand, the remote electronic device receiving the images must first decompress the images and then convert their file type before the images can be played on the remote electronic device. Therefore, the currently available wireless image transmission for cameras has low transmission efficiency due to the required procedure of image file conversion. Further, to enable image file conversion, the current camera devices inevitably have a considerably complicated overall configuration.

It is therefore tried by the inventor to develop a wireless image transmission device that allows images to be wirelessly transmitted therefrom without the need of first being converted in file type, so that the wireless image transmission device can have high transmission efficiency and simplified overall configuration.

SUMMARY OF THE INVENTION

A primary object of the present invention is to provide a wireless image transmission device, which allows images to be wirelessly transmitted therefrom without the need of first being converted in file type and can therefore have high transmission efficiency and simplified overall configuration.

To achieve the above and other objects, the wireless image transmission device according to a first embodiment of the present invention includes an image processing main body; an image display unit electrically connected to the image processing main body; a first switching unit electrically connected to between the image processing main body and the image display unit; an image shooting control unit electrically connected to the first switching unit; and a wireless transmission unit electrically connected to the image shooting control unit.

The wireless image transmission device according to a second embodiment of the present invention can further include a second switching unit electrically connected to between the image shooting control unit and the wireless transmission unit; and the image processing main body is also electrically connected to the second switching unit.

In the present invention, the image shooting control unit can be a cam controller.

In the first embodiment of the present invention, the image processing main body includes an image pickup unit, a processing unit, a memory unit and a power unit. The image pickup unit, the memory unit and the power unit all are electrically connected to the processing unit and the first switching unit is electrically connected to the processing unit.

In the second embodiment of the present invention, the image processing main body includes an image pickup unit, a processing unit, a memory unit and a power unit. The image pickup unit, the memory unit and the power unit all are electrically connected to the processing unit and the first and the second switching unit all are electrically connected to the processing unit.

With these arrangements, images to be wirelessly transmitted from the wireless image device need not be converted in file type, so that the wireless image transmission device can have high transmission efficiency and simplified overall configuration.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
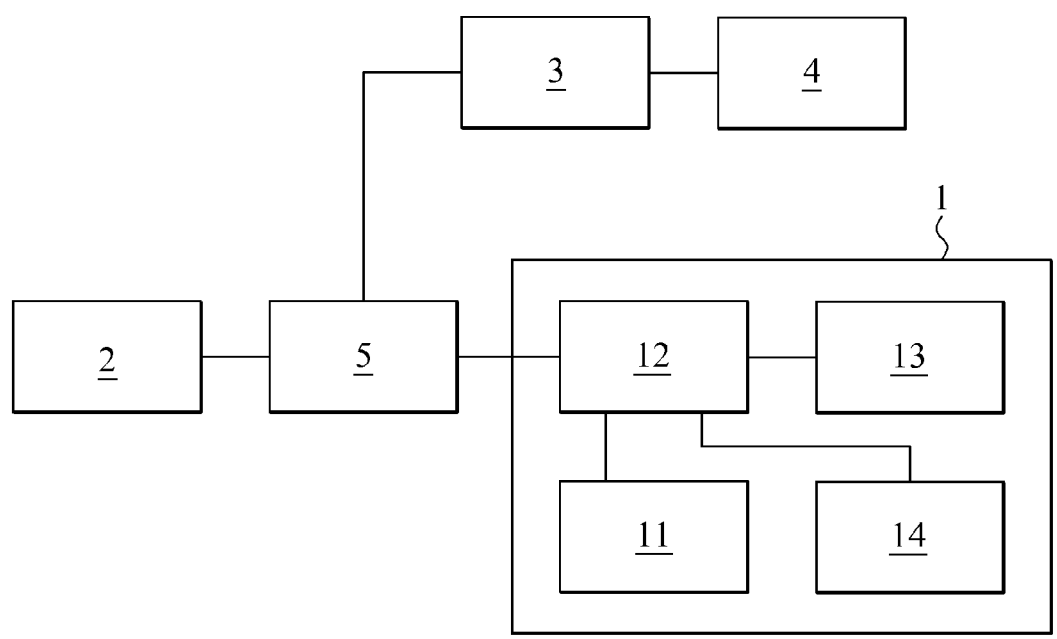
FIG. 1 is a block diagram of a wireless image transmission device according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

FIG. 1 is a block diagram showing a wireless image transmission device according to a first embodiment of the present invention includes an image processing main body 1, an image display unit 2, an image shooting control unit 3, a wireless transmission unit 4, and a first switching unit 5. The image display unit 2 is electrically connected to the image processing main body 1 for displaying still images, such as photos, or moving images, such as videos. The image display unit 2 can be a liquid crystal display (LCD). The first switching unit 5 is electrically connected to between the image processing main body 1 and the image display unit 2. The image shooting control unit 3 is electrically connected to the first switching unit 5. The first switching unit 5 can be a switch, with which a user may selectively transmit images stored in the processing main body 1 or live images captured with the processing main body 1 to the image display unit 2 or the image shooting control unit 3. The images transmitted from the image processing main body 1 to the image display unit 2 and to the image shooting control unit 3 are same in image format. The wireless transmission unit 4 is electrically connected to the image shooting control unit 3. With the image shooting control unit 3, images to be transmitted from the image processing main body 1 need only be compressed without the need of file conversion before they are wirelessly transmitted from the wireless transmission unit 4 to a remote electronic device (not shown) using for example Wireless Fidelity (Wi-Fi). Meanwhile, the wirelessly transmitted compressed images received by the remote electronic device need only be decompressed for direct playing without the need of file conversion again. Therefore, with the wireless image transmission device according to the present invention, no file conversion is needed before wireless transmission of images, which enables the present invention to have high transmission efficiency and simplified overall configuration.

Figure 2:
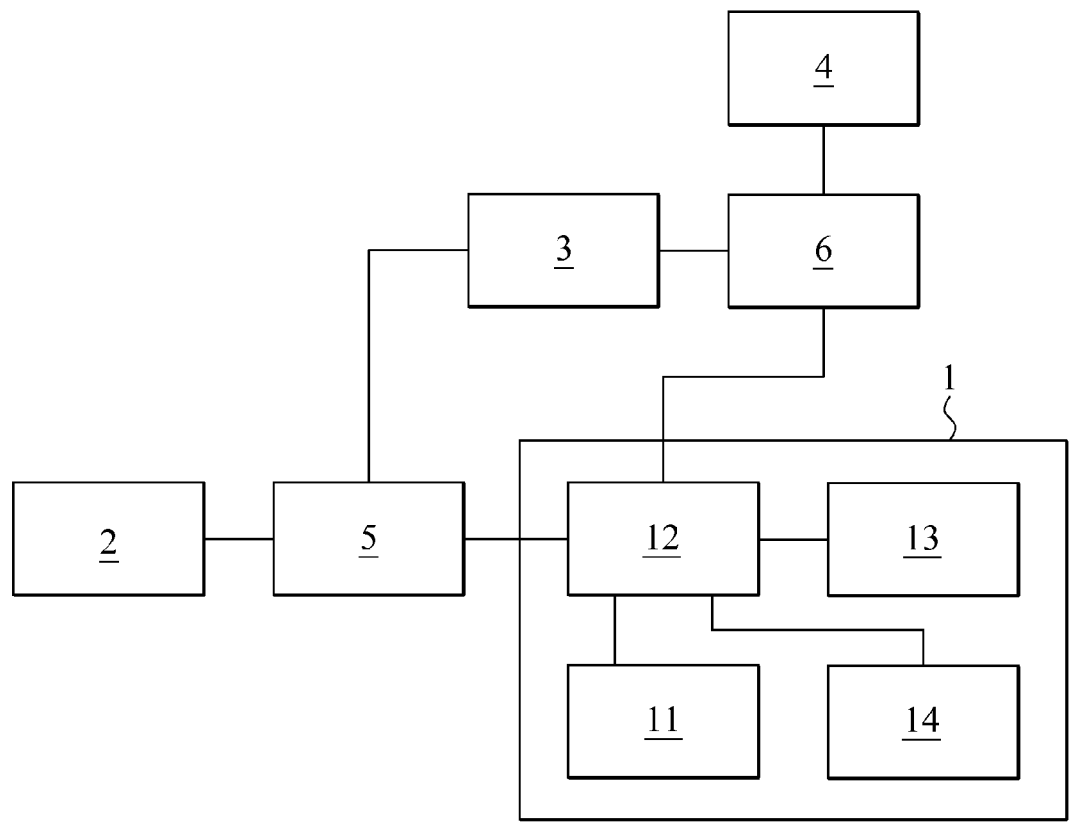
FIG. 2 is a block diagram of a wireless image transmission device according to a second embodiment of the present invention.

FIG. 2 is a block diagram showing a wireless image transmission device according to a second embodiment of the present invention. In the second embodiment, the wireless image transmission device further includes a second switching unit 6 electrically connected to between the image shooting control unit 3 and the wireless transmission unit 4. The image processing main body 1 is also electrically connected to the second switching unit 6. The second switching unit 6 can be a switch, with which a user may select to first convert the file type of and then compress images stored in the processing main body 1 or live images captured with the processing main body 1 before wirelessly transmitting them from the wireless transmission unit 4 to a remote electronic device. Therefore, the second switching unit 6 provides the user with an additional choice for image transmission.

The image shooting control unit 3 can be a cam controller, such as a webcam controller. With the image shooting control unit 3, images stored in the processing main body 1 or live images captured with the processing main body 1 need not be converted in file type but can be directly compressed for wirelessly transmitting from the wireless transmission unit 4 to a remote electronic device, and the wirelessly transmitted compressed images received by the remote electronic device need only be decompressed for direct playing without the need of file conversion again.

The image processing main body 1 can include an image pickup unit 11, a processing unit 12, a memory unit 13 and a power unit 14. The image pickup unit 11, the memory unit 13 and the power unit 14 all are electrically connected to the processing unit 12. The first switching unit 5 is electrically connected to the processing unit 12. The image pickup unit 11 can be a CCD (Charge Coupled Device) or a CMOS (Complementary Metal-Oxide Semiconductor). The processing unit 12 can includes a central processing unit (CPU) and other electronic elements and electronic circuits in connection with image processing. The memory unit 13 can be a hard disk or a memory device. The power unit 14 can be a built-in power supply or an external power source. The first switching unit 5 can be a switch, with which a user may selectively transmit images stored in the processing main body 1 or live images captured with the processing main body 1 to the image display unit 2 or the image shooting control unit 3 from the processing unit 12. Meanwhile, the second switching unit 6 is also electrically connected to the processing unit 12 and can be a switch, with which a user may select to first convert the file type of and then compress images stored in the processing main body 1 or live images captured with the processing main body 1 before wirelessly transmitting them from the processing unit 12 via the wireless transmission unit 4 to a remote electronic device.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A wireless image transmission device, comprising:
   an image processing main body;
   an image display unit being electrically connected to the image processing main body, the image display unit is a liquid crystal display;
   a first switching unit being electrically connected to between the image processing main body and the image display unit;
   an image shooting control unit being electrically connected to the first switching unit, the image shooting control unit is a webcam controller; and
   a wireless transmission unit being electrically connected to the image shooting control unit, wherein images transmitted from the image processing main body to the image display unit and to the image shooting control unit are the same in image format, by the image shooting control unit, the images to be transmitted from the image processing main body only be compressed without file conversion before wirelessly transmitted from the wireless transmission unit to a remote electronic device, the wirelessly transmitted compressed images received by the remote electronic device only be decompressed for direct playing without file conversion.

2. The wireless image transmission device as claimed in claim 1, further comprising a second switching unit electrically connected to between the image shooting control unit and the wireless transmission unit, and the image processing main body being also electrically connected to the second switching unit.

3. The wireless image transmission device as claimed in claim 1, wherein the image processing main body includes an image pickup unit, a processing unit, a memory unit and a power unit; the image pickup unit, the memory unit and the power unit all being electrically connected to the processing unit, and the first switching unit being electrically connected to the processing unit.

4. The wireless image transmission device as claimed in claim 2, wherein the image processing main body includes an image pickup unit, a processing unit, a memory unit and a power unit; the image pickup unit, the memory unit and the power unit all being electrically connected to the processing unit, and the first and the second switching unit all being electrically connected to the processing unit.

\* \* \* \* \*